US012259760B2

(12) United States Patent
Rizzardini et al.

(10) Patent No.: US 12,259,760 B2
(45) Date of Patent: Mar. 25, 2025

(54) LID ANGLE DETECTION

(71) Applicant: STMICROELECTRONICS S.r.l., Agrate Brianza (IT)

(72) Inventors: Federico Rizzardini, Settimo Milanese (IT); Lorenzo Bracco, Chivasso (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 140 days.

(21) Appl. No.: 18/183,464

(22) Filed: Mar. 14, 2023

(65) Prior Publication Data
US 2023/0384837 A1 Nov. 30, 2023

Related U.S. Application Data

(63) Continuation-in-part of application No. 17/827,395, filed on May 27, 2022, now Pat. No. 12,146,894.

(51) Int. Cl.
*G06F 1/16* (2006.01)
*G01C 1/00* (2006.01)
*G01C 9/08* (2006.01)
*G01C 19/5705* (2012.01)
*G01P 3/44* (2006.01)
(Continued)

(52) U.S. Cl.
CPC ............ *G06F 1/1677* (2013.01); *G01C 1/00* (2013.01); *G06F 1/3246* (2013.01); *H04M 1/0245* (2013.01); *G01C 9/08* (2013.01); *G01C 19/5705* (2013.01); *G01P 3/44* (2013.01)

(58) Field of Classification Search
CPC .... G06F 1/1652; G06F 1/1616; G06F 1/3265; G06F 1/1677; G06F 1/3231; G06F 1/1641; G06F 1/3215; G06F 1/1694; G06F 1/3246; G06F 1/3206; G06F 1/3287; G09F 9/301; G01P 15/18; G01P 15/04; G01P 3/44; G01D 5/145; G01D 1/16; H04M 1/0245; G01C 1/00; G01C 19/5705; G01C 9/08
See application file for complete search history.

(56) References Cited

U.S. PATENT DOCUMENTS 5,704,435 A 1/1998 Meyer et al.
9,160,261 B2 10/2015 Nishikimi
(Continued)

FOREIGN PATENT DOCUMENTS

CN 201493816 U 6/2010
CN 101788850 A 7/2010
(Continued)

*Primary Examiner* — An H Do
(74) *Attorney, Agent, or Firm* — Seed IP Law Group LLP

(57) ABSTRACT

The present disclosure is directed to a device and method for lid angle detection that is accurate even if the device is activated in an upright position. While the device is in a sleep state, first and second sensor units measure acceleration and angular velocity, and calculate orientations of respective lid components based on the acceleration and angular velocity measurements. Upon the device exiting the sleep state, a processor estimates the lid angle using the calculated orientations, sets the estimated lid angle as an initial lid angle, and updates the initial lid angle using, for example, two accelerometers; two accelerometers and two gyroscopes; two accelerometers and two magnetometers; or two accelerometers, two gyroscopes, and two magnetometers.

20 Claims, 2 Drawing Sheets

(51) Int. Cl.
*G06F 1/3246* (2019.01)
*H04M 1/02* (2006.01)

(56) References Cited

U.S. PATENT DOCUMENTS

| | | | |
|---|---|---|---|
| 9,612,625 | B2 | 4/2017 | Oliver et al. |
| 9,707,043 | B2 | 7/2017 | Bozung |
| 9,823,093 | B2 | 11/2017 | Kauhaniemi et al. |
| 9,897,465 | B2 | 2/2018 | DiFonzo et al. |
| 10,054,444 | B2 | 8/2018 | Czompo et al. |
| 10,062,362 | B2 | 8/2018 | Kwak et al. |
| 10,063,677 | B2 | 8/2018 | Cavallaro et al. |
| 10,114,464 | B2 | 10/2018 | Micali et al. |
| 10,198,086 | B2 | 2/2019 | Parazynski et al. |
| 10,238,510 | B2 | 3/2019 | van der Walt et al. |
| 10,386,203 | B1 | 8/2019 | Zheng |
| 10,509,466 | B1 | 12/2019 | Miller et al. |
| 10,558,277 | B2 | 2/2020 | Henell |
| 10,976,150 | B2 | 4/2021 | Zancanato et al. |
| 11,656,071 | B2 * | 5/2023 | Rizzardini ............ G01D 5/142 700/275 |
| 11,921,548 | B2 * | 3/2024 | Rivolta ................. G06F 1/1677 |
| 2003/0203747 | A1 | 10/2003 | Nagamine |
| 2005/0103135 | A1 | 5/2005 | Forster et al. |
| 2008/0255795 | A1 | 10/2008 | Shkolnikov |
| 2009/0259424 | A1 | 10/2009 | Dutta et al. |
| 2012/0259578 | A1 | 10/2012 | Bevilacqua et al. |
| 2013/0269961 | A1 | 10/2013 | Lim et al. |
| 2014/0116133 | A1 | 5/2014 | Sheynblat et al. |
| 2015/0116362 | A1 | 4/2015 | Aurongzeb et al. |
| 2015/0130725 | A1 | 5/2015 | Knepper et al. |
| 2015/0177272 | A1 | 6/2015 | Clark |
| 2016/0147266 | A1 | 5/2016 | Chng et al. |
| 2016/0274722 | A1 | 9/2016 | Putzolu et al. |
| 2017/0003751 | A1 | 1/2017 | Micali et al. |
| 2017/0010657 | A1 | 1/2017 | Schneider |
| 2017/0235355 | A1 | 8/2017 | Alshinnawi et al. |
| 2017/0258532 | A1 | 9/2017 | Shalayev et al. |
| 2017/0288295 | A1 | 10/2017 | Sultenfuss et al. |
| 2017/0299388 | A9 | 10/2017 | Karahan et al. |
| 2018/0340768 | A1 | 11/2018 | Zancanato et al. |
| 2019/0009398 | A1 | 1/2019 | Zhong et al. |
| 2019/0094264 | A1 | 3/2019 | Zheng et al. |
| 2019/0126456 | A1 | 5/2019 | Abbott et al. |
| 2020/0233537 | A1 | 7/2020 | Hong et al. |
| 2020/0340794 | A1 | 10/2020 | Park |
| 2021/0154820 | A1 | 5/2021 | Bianco et al. |
| 2021/0207940 | A1 | 7/2021 | Zancanato et al. |
| 2021/0348911 | A1 | 11/2021 | Rizzardini et al. |
| 2023/0251078 | A1 | 8/2023 | Rizzardini et al. |

FOREIGN PATENT DOCUMENTS

| | | |
|---|---|---|
| CN | 103678184 A | 3/2014 |
| CN | 104461330 A | 3/2015 |
| CN | 104718561 A | 6/2015 |
| CN | 105405692 A | 3/2016 |
| CN | 105424040 A | 3/2016 |
| CN | 205289837 U | 6/2016 |
| CN | 105983949 A | 10/2016 |
| CN | 106482734 A | 3/2017 |
| CN | 108762324 A | 11/2018 |
| CN | 114035345 A | 2/2022 |
| EP | 0823720 A1 | 2/1998 |
| EP | 2151734 A2 | 2/2010 |
| EP | 2930467 A1 | 10/2015 |
| EP | 3065031 A1 | 9/2016 |
| EP | 3407157 A1 | 11/2018 |
| EP | 3862841 A1 | 8/2021 |
| JP | 2001113475 A | 4/2001 |
| JP | 2013066944 A | 4/2013 |
| WO | WO 2019150657 A1 | 8/2019 |
| WO | WO 2019168735 A1 | 9/2019 |
| WO | WO 2021128245 A1 | 7/2021 |

\* cited by examiner

LID ANGLE DETECTION

BACKGROUND

Technical Field

The present disclosure is directed to lid angle detection.

Description of the Related Art

Lid angle detection involves determining the angle between two lid components of a foldable electronic device, such as a laptop and a foldable mobile device, that fold on to each other about a hinge or folding portion. Typically, one of the two lid components includes a display, and the other of the two lid components includes another display or a user input device, such as a keyboard.

The angle between the two lid components is often referred to as a lid or hinge angle. Generally, the lid angle of a foldable electronic device is equal to zero degrees when the foldable electronic device is in a closed state (e.g., the display of the first lid component faces the display of the second lid component), and 180 degrees when the foldable electronic device is in a fully open state (e.g., the display of first lid component and the display of the second lid component face in the same direction).

Current lid angle detection solutions are high cost and have high power consumption. Further, for foldable mobile devices, current lid angle detection solutions are unable to accurately determine a lid angle when the foldable mobile device is activated in an upright position (e.g., the hinge or folding portion of the foldable mobile device extends in a direction parallel to gravity) or in a non-steady state (e.g., while the foldable mobile device is being moved or shaken).

In particular, the lid angle cannot be determined if the foldable mobile device is in upright position or in a non-steady state when starting the lid angle detection solution. In order to manage the corner case indicated above, the lid angle detection solution is always running (even when the foldable mobile device is otherwise in a sleep mode). This causes, in time, a high power consumption as a high powered processor is always active. Alternatively, hall sensors or magnetometers are used to solve the problem, adding cost and power consumption.

As foldable electronic devices, especially foldable mobile telephones, are becoming more popular, it is desirable for manufactures to incorporate an accurate, low cost lid angle detection solution, which also functions when the device is activated in the upright position, in foldable electronic devices.

BRIEF SUMMARY

The present disclosure is directed to lid or hinge angle detection for foldable devices, such as a foldable mobile phone. Unlike current detection methods, the lid angle detection disclosed herein is able to detect the lid angle in a case where the foldable device is activated in an upright position (e.g., when the lid axis is parallel to gravity) or in a non-steady state (e.g., while the foldable mobile device is being moved or shaken). Further lid angle detection may continue to be performed while the device enters a sleep state.

The device includes a high powered application processor, and low powered first and second sensor units positioned in respective lid components. The application processor is the main processing unit of the device, and is put into a sleep state when the device is in a sleep state. The first and second sensor units are multi-sensor devices that include multiple sensors (e.g., an accelerometer, magnetometer, gyroscope, etc.), and are capable of performing simple algorithms. In contrast to the application processor, the first and second sensor units remain in an on state even when the device is in a sleep state.

When the device is in the sleep state, the first and second sensor units measure acceleration and angular velocity, and calculate orientations of the respective lid components based on the acceleration and angular velocity measurements. Upon the device and the application processor exiting the sleep state, the application processor estimates the lid angle using the calculated orientations, and sets the estimated lid angle as an initial lid angle. The application processor subsequently updates the initial lid angle using one or more of acceleration, magnetometer, or gyroscope measurements.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing electronic components, foldable devices, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, current lid angle detection solutions are high cost and have high power consumption. Further, for foldable mobile devices, current lid angle detection solutions are unable to determine a lid angle when the foldable mobile device is activated in an upright position (e.g., the hinge or folding portion of the foldable mobile device extends in a direction parallel to gravity) or in a non-steady state (e.g., while the foldable mobile device is being moved or shaken).

The present disclosure is directed to a device and method for lid angle detection. The lid angle detection disclosed herein provides an accurate, low cost lid angle detection solution, which also functions while a foldable electronic device is activated in an upright position or in a non-steady state.

Figure 1:
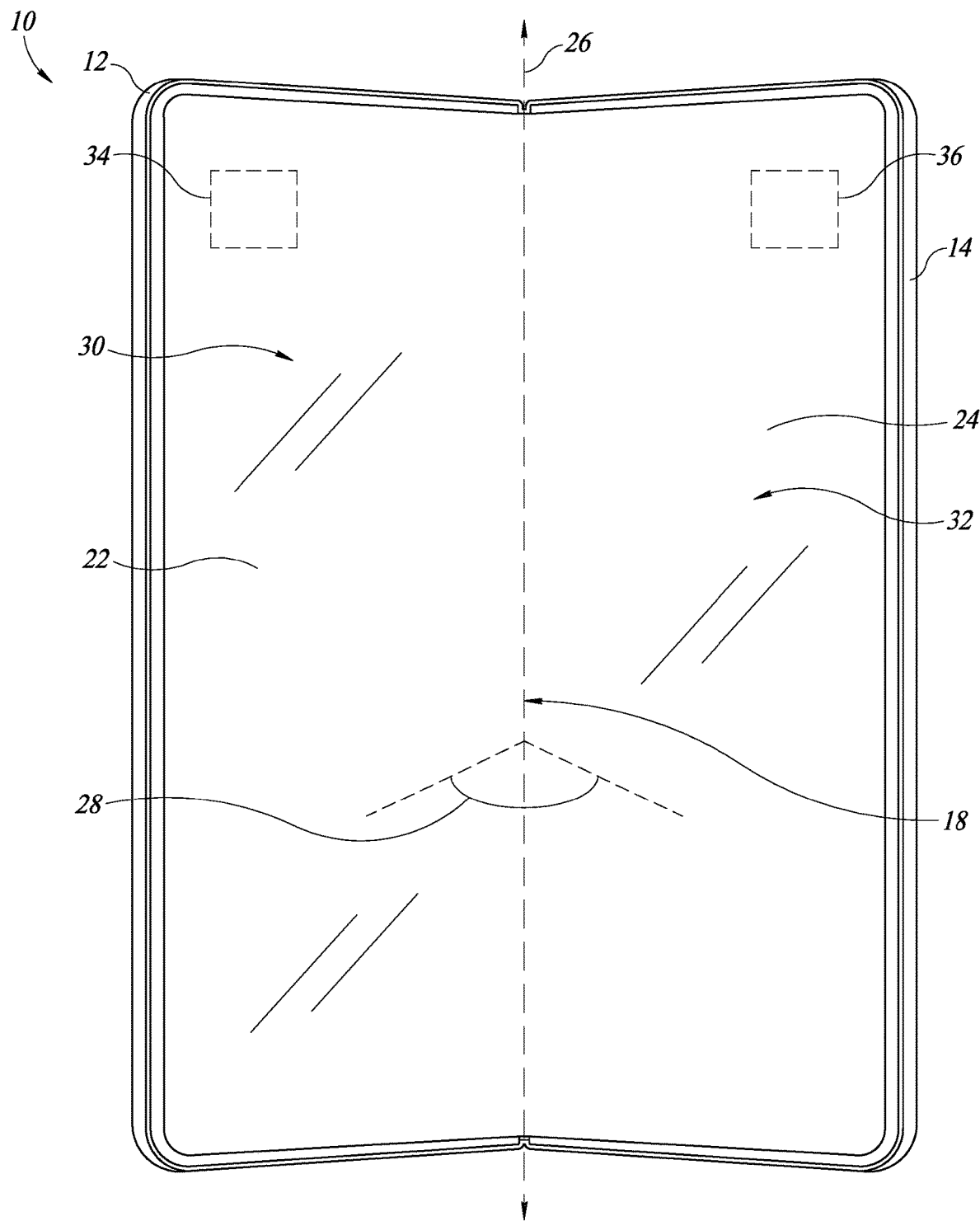
FIG. 1 is a device according to an embodiment disclosed herein.

FIG. 1 is a device 10 according to an embodiment disclosed herein. In this embodiment, the device 10 is a foldable mobile device, such as a portable smart device, tablet, and telephone. The device 10 may also be another type of device, such as a laptop. The device 10 includes a first lid component 12, a second lid component 14, and a hinge 18.

Each of the first lid component 12 and the second lid component 14 includes a casing or housing that houses internal components (e.g., processors, sensors, capacitors, resistors, amplifiers, speakers, etc.) of the device 10. As will be discussed in further detail below, a first sensor unit 34 and a second sensor unit 36 are housed within the first lid component 12 and the second lid component 14, respectively.

The first lid component 12 and the second lid component 14 include a first user interface 22 and a second user interface 24, respectively. In the embodiment shown in FIG. 1 and in the embodiments discussed below, the first user interface 22 and the second user interface 24 are displays. However, each of the first user interface 22 and the second user interface 24 may be a display (e.g., a monitor, touch screen, etc.), a user input device (e.g., buttons, a keyboard, etc.), and/or another type of user interface. In one embodiment, the first user interface 22 and the second user interface 24 are two portions of a single, flexible display.

The first lid component 12 and the second lid component 14 fold on to each other, similar to a book, about the hinge 18. The first lid component 12 and the second lid component 14 rotate relative to a hinge axis 26. The hinge 18 may any type of mechanism that allows the first lid component 12 and the second lid component 14 to rotate relative to the hinge axis 26.

As will be discussed in further detail below, the device 10 performs lid angle detection to determine a lid angle 28 between the first lid component 12 and the second lid component 14. The lid angle 28 is the angle between a first surface 30 of the first lid component 12, more specifically the first user interface 22, and a second surface 32 of the second lid component 14, more specifically the second user interface 24. The lid angle 28 is equal to zero degrees when the foldable electronic device is in a closed state (e.g., the first surface 30 faces the second surface 32), and 180 degrees when the foldable electronic device is in a fully open state (e.g., the first surface 30 and the second surface 32 face in the same direction).

Figure 2:
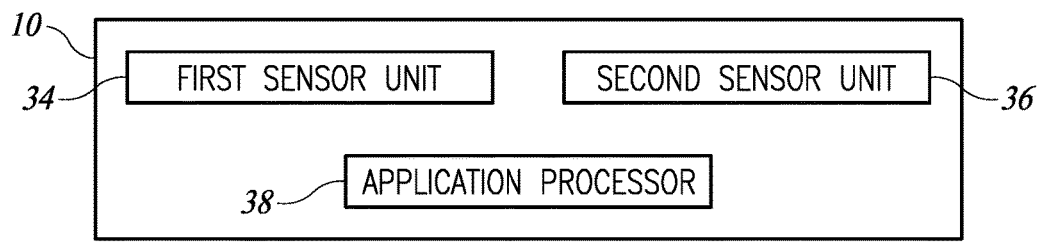
FIG. 2 is a block diagram of a device according to an embodiment disclosed herein.

FIG. 2 is a block diagram of the device 10 according to an embodiment disclosed herein. The device 10 includes a first sensor unit 34, a second sensor unit 36, and an application processor 38.

Each of the first sensor unit 34 and the second sensor unit 36 is a multi-sensor device that includes one or more types of sensors including, but not limited to, an accelerometer and a gyroscope, and a magnetometer. The accelerometer measures acceleration along one or more axes. The gyroscope measures angular velocity along one or more axes. The magnetometer measures magnetic fields along one or more axes.

Each of the first sensor unit 34 and the second sensor unit 36 also includes its own onboard memory and processor. The processor is configured to process data generated by the sensors, and execute simple programs, such as finite state machines and decision tree logic.

The first sensor unit 34 and the second sensor unit 36 are positioned in the first lid component 12 and the second lid component 14, respectively. As will be discussed in further detail below, the first sensor unit 34 and the second sensor unit 36 determine orientations of the first lid component 12 and the second lid component 14, respectively, for lid angle detection.

The first sensor unit 34 and the second sensor unit 36 are power-efficient, low-powered devices that remain on after the device 10 enters a sleep state. In one embodiment, each of the first sensor unit 34 and the second sensor unit 36 consumes between 5 and 120 microamps for processing. In the sleep state, the application processor 38 and other electronic components (e.g., speakers, sensors, processors) of the device 10 are set to a low-powered or off state.

The application processor 38 is a general purpose processing unit. The application processor 38 may be any type of processor, controller, or signal processor configured to process data. In one embodiment, the application processor 38 is the device's 10 own general purpose processor that, along with processing data for lid angle detection discussed below, is utilized to process data for the operating system, user applications, and other types of software of the device 10. As will be discussed in further detail below, the application processor 38 processes the orientations determined by the first lid component 12 and the second lid component 14 to obtain an initial lid angle value of the device 10, and performs lid angle detection to obtain current lid angle values.

The application processor 38 may be positioned within the first lid component 12, along with the first sensor unit 34; or the second lid component 14, along with the second sensor unit 36.

The application processor 38 is a high-powered processing unit that is set to a low-powered or off state when the device 10 enters the sleep state. In one embodiment, the application processor 38 consumes between 1 to few tenths of milliamps during processing. While in a low-powered or off state, the application processor 38 is unable to receive sensor measurements from the first sensor unit 34 and the second sensor unit 36 and, thus, unable to perform lid angle detection.

Figure 3:
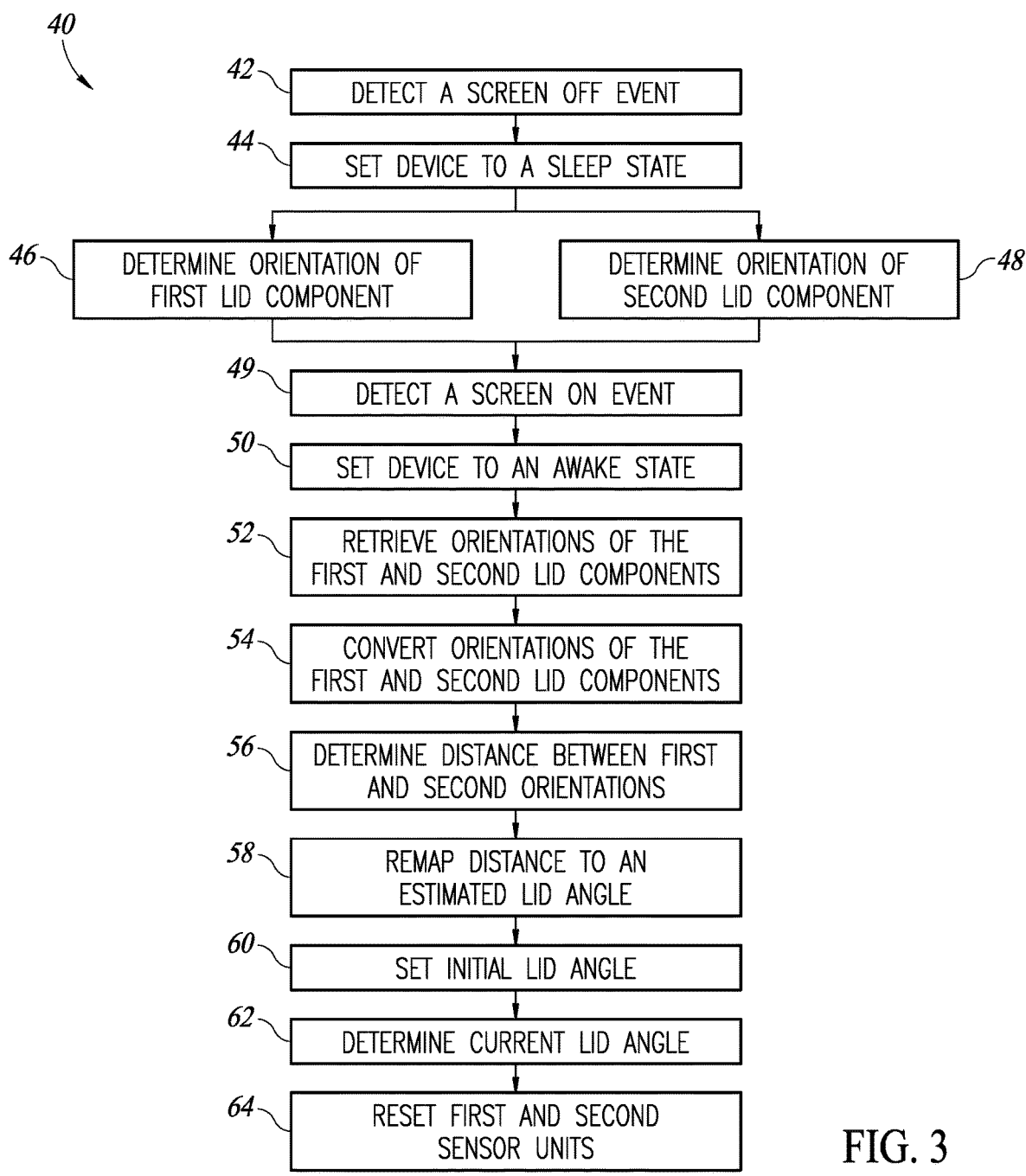
FIG. 3 is a flow diagram of a method according to an embodiment disclosed herein.

FIG. 3 is a flow diagram of a method 40 according to an embodiment disclosed herein. The method 40 performs lid angle detection for the device 10.

In block 42, the device 10 detects whether or not a screen off event has occurred. The screen off event may be detected by the first sensor unit 34, the second sensor unit 36, the application processor 38, or another electronic component (e.g., processor, sensor, etc.) included in the device 10.

In a screen off event, the first user interface 22 and/or the second user interface 24 of the device 10 are set to a low-powered or off state, and no images are displayed on the screens. In one embodiment, the screen off event occurs in response to a user initiating a power button of the device 10, in response to the device 10 being in a closed state (e.g., the first surface 30 of the first lid component 12 faces the second surface 32 of the second lid component 14 in FIG. 1), or in response to a determined amount of time of user inactivity. In a case where the device 10 detects the screen off event, the method 40 moves to block 44.

In block 44, the device 10 is set to a sleep state. As discussed above, in the sleep state, the application processor 38 and other electronic components (e.g., speakers, sensors, processors) of the device 10 are set to a low-powered or off state.

While in a low-powered or off state, the application processor 38 is unable to receive sensor measurements from the first sensor unit 34 and the second sensor unit 36 and, thus, is unable to perform lid angle detection. In contrast, the first sensor unit 34 and the second sensor unit 36 remain on and operational even when the device 10 enters the sleep state. The method 40 then moves to blocks 46 and 48, which may be performed concurrently.

It is noted that the device 10 is in the sleep state during blocks 46 and 48. Thus, the application processor 38 is in a low-powered or off state, while the first sensor unit 34 and the second sensor unit 36 remain on and operational. Block 46 and block 48 are performed by the first sensor unit 34 and the second sensor unit 36, respectively.

In block 46, the first sensor unit 34, more specifically a processor of the first sensor unit 34, determines an orientation or position of the first lid component 12, more specifically the first surface 30 of the first lid component 12. As discussed above with respect to FIG. 1, the first sensor unit 34 is positioned in the first lid component 12.

Similarly, in block 48, the second sensor unit 36, more specifically a processor of the second sensor unit 36, determines an orientation or position of the second lid component 14, more specifically the second surface 32 of the second lid component 14. As discussed above with respect to FIG. 1, the second sensor unit 36 is positioned in the second lid component 14.

The first sensor unit 34 and the second sensor unit 36 determine the orientations of the first lid component 12 and the second lid component 14, respectively, based on acceleration and angular velocity measurements along one or more axes. Further, the orientations are represented as quaternions.

In a case where the first sensor unit 34 includes a 3-axis accelerometer that measures accelerations along an X-axis, a Y-axis transverse to the X-axis, and Z-axis transverse to the X-axis and the Y-axis; and includes a 3-axis gyroscope that measures angular velocities along an X-axis, a Y-axis transverse to the X-axis, and Z-axis transverse to the X-axis, the quaternion $q_1$ of the first lid component 12 is equal to $(x_1, y_1, z_1)$, where $x_1, y_1, z_1$ represent the vector component of the quaternion representing the orientation of the first lid component 12. Similarly, in a case where the second sensor unit 36 includes a 3-axis accelerometer and a 3-axis gyroscope, the quaternion $q_2$ of the second lid component 14 is equal to $(x_2, y_2, z_2)$, where $x_2, y_2, z_2$ represent the vector component of the quaternion representing the orientation of the second lid component 14.

The first sensor unit 34 and the second sensor unit 36 determine the orientations of the first lid component 12 and the second lid component 14, respectively, repeatedly to ensure that the orientations are current and accurate. In one embodiment, the first sensor unit 34 and the second sensor unit 36 determine the orientations of the first lid component 12 and the second lid component 14, respectively, at determined intervals (e.g., every 5, 10, 15 milliseconds, etc.).

Once the first sensor unit 34 determines the orientation of the first lid component 12 in block 46 and the second sensor unit 36 determines the orientation of the second lid component 14 in block 48 at least once, the method 40 moves to block 49.

In block 49, the device 10 detects whether or not a screen on event has occurred. The screen on event may be detected by the first sensor unit 34, the second sensor unit 36, the application processor 38, or another electronic component (e.g., processor, sensor, etc.) included in the device 10.

In a screen on event, the first user interface 22 or the second user interface 24 of the device 10 are set to an on state and display images. In one embodiment, the screen on event occurs in response to a user initiating a power button of the device 10, in response to the device 10 being in an open state (e.g., the first surface 30 of the first lid component 12 and the second surface 32 of the second lid component 14 face in the same direction in FIG. 1), or in response to a determined amount of time of user activity. In a case where the device 10 detects the screen on event, the method 40 moves to block 50.

In block 50, the device 10 is set to an awake state. In contrast to the sleep state, in the awake state, the application processor 38 and other electronic components (e.g., speakers, sensors, processors) of the device 10 are set to an on state and are fully operational. For example, the application processor 38 is able to receive sensor measurements from the first sensor unit 34 and the second sensor unit 36, and perform lid angle detection. The method 40 then moves to block 52. It is noted that the device 10 remains in the awake state during blocks 52 to 64.

In block 52, the application processor 38 retrieves the latest, most current orientations of the first lid component 12 and the second lid component 14 determined by the first sensor unit 34 and the second sensor unit 36, respectively, in blocks 46 and 48. In one embodiment, the orientations determined by the first sensor unit 34 and the second sensor unit 36 are saved in their respective internal memories, and the application processor 38 retrieves the orientations directly from the first sensor unit 34 and the second sensor unit 36. In another embodiment, the orientations determined by the first sensor unit 34 and the second sensor unit 36 are saved to a shared memory, which is shared between the first sensor unit 34, the second sensor unit 36, and the application processor 38; and the application processor 38 retrieves the orientations from the shared memory. The method 40 then moves to block 54.

In block 54, in order for the application processor to process orientation data generated by the first sensor unit 34 and the second sensor unit 36, the application processor 38 converts the format of the orientations of the first lid component 12 and the second lid component 14 to a format used by the application processor 38. For example, in one embodiment, the orientations determined by the first sensor unit 34 and the second sensor unit 36 are in a half precision floating point format, and the application processor 38 converts the orientations to a single precision floating point format.

In a case where the quaternion $q_1$ is represented using the vector component due to memory limitations, the quaternion $q_1$ of the first lid component 12 is converted to a quaternion $q_1'$ equal to $(x_1', y_1', z_1', w_1')$, using equations (1) to (4) below:

$$x_1'=x_1 \quad (1)$$

$$y_1'=y_1 \quad (2)$$

$$z_1'=z_1 \quad (3)$$

$$w_1'=\sqrt{1-(x_1'^2+y_1'^2+z_1'^2)} \quad (4)$$

Similarly, the quaternion $q_2$ of the second lid component 14 is converted to a quaternion $q_2'$ equal to $(x_2', y_2', z_2', w_2')$, using equations (5) to (8) below:

$$x_2'=x_2 \quad (5)$$

$$y_2' = y_2 \qquad (6)$$

$$z_2' = z_2 \qquad (7)$$

$$w_2' = \sqrt{1 - (x_2'^2 + y_2'^2 + z_2'^2)} \qquad (8)$$

The method 40 then moves to block 56. It is noted that block 54 may be removed from the method 40 in a case where the first sensor unit 34, the second sensor unit 36, and the application processor 38 utilize the same data formats. In this case, the method 40 moves from block 52 to block 56.

In block 56, the application processor 38 determines a distance d between the orientation of the first lid component 12 and the orientation of the second lid component 14. The distance d represents an angular distance between the first lid component 12 and the second lid component 14. The distance d is calculated using equation (9) below:

$$d = \cos^{-1}(2(q_1' \cdot q_2')^2 - 1) \qquad (9)$$

where the dot operator denotes the dot or inner product. The method then moves to block 58.

In block 58, the application processor 38 remaps the distance d to an estimated lid angle $lid_o$ of the device 10. Due to the estimated lid angle $lid_o$ being determined based on the most current orientations of the first lid component 12 and the second lid component 14 retrieved in block 52, the estimated lid angle $lid_o$ is an estimated lid angle of the device 10 at the time of the screen on event in block 49. As discussed above with respect to FIG. 1, the lid angle is the angle between the first surface 30 of the first lid component 12, more specifically the first user interface 22, and the second surface 32 of the second lid component 14, more specifically the second user interface 24.

The distance d is remapped to the estimated lid angle $lid_o$ such that a minimum of the estimated lid angle $lid_o$ is zero degrees, which occurs when the device 10 is in a closed state (e.g., the first surface 30 faces the second surface 32); and a maximum of the estimated lid angle $lid_o$ is 180 degrees, which occurs when the device 10 is in a fully open state (e.g., the first surface 30 and the second surface 32 face in the same direction). The estimated lid angle $lid_o$ is calculated using equation (10) below:

$$lid_o = 360 - (d + 180) \qquad (10)$$

The method then moves to block 60.

In block 60, the application processor 38 sets the estimated lid angle $lid_o$ as an initial lid angle of the device 10, which is the lid angle between the first surface 30 of the first lid component 12 and the second surface 32 of the second lid component 14 at the time of the screen on event in block 49 and the awake state in block 50. The method 40 then moves to block 62.

Using the estimated lid angle $lid_o$, which was previously determined, as the initial lid angle of the device 10 is particularly useful in situations where lid angle detection is currently unreliable or inaccurate. For example, many lid angle detection solutions are often inaccurate when the device 10 is activated in an upright position or is in a non-steady state.

In one embodiment, the estimated lid angle $lid_o$ is set as the initial lid angle in a case where the device 10 is activated in an upright position or is in a non-steady state. In the upright position, referring to FIG. 1, the hinge axis 26 of the device 10 is parallel to gravity. In the non-steady state, the device 10 is undergoing movement by, for example, being shaken or moved by a user.

If the device 10 is not in the upright position (e.g., the hinge axis 26 is not parallel to gravity) or not in the non-steady state (e.g., the device 10 is in a steady state), block 60 is not performed and the method 40 moves from block 58 to block 62. In another embodiment, if the device 10 is not in the upright position or not in the non-steady state, blocks 52, 54, 56, 58 are not performed and the method 40 moves from block 50 to block 62.

The application processor 38 determines the device 10 is in the upright position based on acceleration measurements, gyroscope measurements, or a combination thereof that are generated by one or more of the first sensor unit 34 and the second sensor unit 36. For example, the application processor 38 determines the device 10 is in the upright position in response to the acceleration measurements and/or the gyroscope measurements indicating that the hinge axis 26 of the device 10 is parallel to gravity.

The application processor 38 determines the device 10 is in the non-steady state based on acceleration measurements, gyroscope measurements, or a combination thereof that are generated by one or more of the first sensor unit 34 and the second sensor unit 36. For example, the application processor 38 determines the device 10 is in the non-steady state in response to one or more of acceleration, a variance of acceleration, a mean of acceleration, a difference between a current acceleration and the mean of acceleration, angular velocity, a variance of angular velocity, a mean of angular velocity, or a difference between a current angular velocity and the mean of angular velocity, along one or more axes, being greater than a respective threshold value.

In block 62, the application processor 38 determines a current lid angle of the device 10. In one embodiment, the application processor 38 determines the current lid angle based on the initial lid angle determined in block 60. For example, the application processor 38 determines the current lid angle based on a detected change in lid angle starting from the initial lid angle.

As the device 10 is in the awake state and not limited to utilizing just the first sensor unit 34 and the second sensor unit 36, the device 10 may determine the current lid angle with any number of different techniques of calculating lid angle, which utilize, for example, two accelerometers; two accelerometers and two gyroscopes; two accelerometers and two magnetometers; or two accelerometers, two gyroscopes, and two magnetometers. In addition, any of these configurations can be combined with a hall sensor and a magnet. The usage of two gyroscopes could also be implemented together with a hall sensor and a magnet (or an equivalent "switch" sensor to detect when the device is closed).

For example, the application processor 38 may recursively determine the current lid angle between the first lid component 12 and the second lid component 14 as a function of measurement signals generated by a first accelerometer of the first sensor unit 34, a second accelerometer of the second sensor unit 36, a first gyroscope of the first sensor unit 34, and a second gyroscope of the second sensor unit 36. In this example, the current lid angle is determined as a function of a weight indicative of a reliability of the measurement signals as being indicative of the lid angle between the first lid component 12 and the second lid component 14. In some cases, the application processor 38 may also generate a first intermediate calculation indicative of the lid angle between the first lid component 12 and the second lid component 14 as a function of measurement signals generated by the first and second accelerometers; generate a second intermediate calculation indicative of the lid angle as a function of measurement signals generated by the first and second gyroscopes; and determine the current lid angle as a weighted sum of the first intermediate calculation and the second intermediate calculation.

As another example, a first magnetometer of the first sensor unit 34 and a second magnetometer of the second sensor unit 36 may generate first signals that are indicative of measurements of a magnetic field external to the device 10 and are indicative of a relative orientation of the first lid component 12 with respect to the second lid component 14. The application processor 38 may then acquire the first signals; generate, as a function of the first signals, a calibration parameter indicative of a condition of calibration of the first and second magnetometers; generate, as a function of the first signals, a reliability value indicative of a condition of reliability of the first signals; calculate an intermediate value of the current lid angle based on the first signals; and calculate the current lid angle based on the calibration parameter, the reliability value, and the intermediate value. In order to improve accuracy, the calibration parameter, the reliability value, and the intermediate value may also be used in conjunction with the current lid angle determined with accelerometer and gyroscopes discussed above.

Once the current lid angle is determined, a function of the device 10 may be controlled based on the current lid angle. For example, power states of the device, and user interfaces displayed on the first user interface 22 and the second user interface 24 may be adjusted based on the current lid angle.

The method 40 then moves to block 64. However, it is noted that execution of block 62 is repeated (e.g., every 5, 10, 15 milliseconds, etc.) while block 64 is performed to ensure the orientations of the first lid component 12 and the second lid component 14 remain accurate. Further, at this time, block 42 is performed concurrently with block 62 in order to detect whether or not another screen off event has occurred. The repeated execution of block 62 halts upon detection of a screen off event.

In block 64, the application processor 38 resets the orientation processing logic of the first sensor unit 34 and the second sensor unit 36 (e.g., the processing logic used in blocks 46 and 48). Resetting the orientation processing logic improves accuracy as measurements errors often accumulate over time, causing a drift in the yaw estimations of the orientations of the first lid component 12 and the second lid component 14.

The reset of the orientation processing logic of the first sensor unit 34 and the second sensor unit 36 is performed upon determining the device 10 is in a known state.

In a first embodiment, the resetting of the orientation processing logic is performed when the device 10 is in a steady state and a fully open state. Being in the steady state reduces error caused by linear acceleration when the first sensor unit 34 and the second sensor unit 36 are initialized. Further, the fully open state intrinsically forces the first sensor unit 34 and the second sensor unit 36 to start with the same yaw.

In the steady state, the device 10 is not being moved or shaken. The application processor 38 determines the device 10 is in the steady state based on acceleration measurements, gyroscope measurements, or a combination thereof that are generated by one or more of the first sensor unit 34 and the second sensor unit 36. For example, the application processor 38 determines the device 10 is in the steady state in response to one or more of acceleration, a variance of acceleration, a mean of acceleration, a difference between a current acceleration and the mean of acceleration, angular velocity, a variance of angular velocity, a mean of angular velocity, or a difference between a current angular velocity and the mean of angular velocity, along one or more axes being less than a respective threshold value.

In the fully open state, referring to FIG. 1, the first surface 30 and the second surface 32 face in the same direction. The application processor 38 determines the device 10 is in the fully open state based on the current lid angle determined in block 62. For example, the application processor 38 determines the device 10 is in the fully open state in response to the current lid angle being within a threshold angle (e.g., 1, 2, or 3 degrees, etc.) of 180 degrees.

In response to determining the device 10 is in the steady state and the fully open state, the application processor 38 transmits a reset signal to the first sensor unit 34 and the second sensor unit 36. Upon receiving the reset signal, the orientation processing logic of the first sensor unit 34 and the second sensor unit 36 is reset.

In a second embodiment, the resetting of the orientation processing logic is performed when the device 10 is in (1) a steady state and (2) either in a fully open state or a closed state. As discussed above, being in the steady state reduces error caused by linear acceleration when the first sensor unit 34 and the second sensor unit 36 are initialized.

As discussed above, in the fully open state, referring to FIG. 1, the first surface 30 and the second surface 32 face in the same direction. In contrast, in the closed state the first surface 30 and the second surface 32 face each other. The application processor 38 determines the device 10 is in the closed state based on the current lid angle determined in block 62. For example, the application processor 38 determines the device 10 is in the closed state in response to the current lid angle being within a threshold angle (e.g., 1, 2, or 3 degrees, etc.) of 0 degrees.

In response to determining the device 10 is in (1) the steady state and (2) either in the fully open state or the closed state, the application processor 38 transmits a reset signal to the first sensor unit 34 and the second sensor unit 36. Upon receiving the reset signal, the orientation processing logic of the first sensor unit 34 and the second sensor unit 36 is reset.

In the second embodiment, the configuration of either the first sensor unit 34 orientation processing logic and/or the second sensor unit 36 orientation processing logic is changed based on whether the resetting is in response to the device 10 being in the fully open state or the closed state. More specifically, the coordinate system (e.g., east-north-up (ENU) coordinate system) of one of the first sensor unit 34 orientation processing logic and the second sensor unit 36 orientation processing logic is set to be aligned with the coordinate system of the other of the first sensor unit 34 orientation processing logic and the second sensor unit 36 orientation processing logic based on whether the resetting is caused by the device 10 being in the fully open state or the closed state.

In a case where the first sensor unit 34 orientation processing logic and the second sensor unit 36 orientation processing logic both utilize the same coordinate system, the coordinate systems of both the first sensor unit 34 orientation processing logic and the second sensor unit 36 orientation processing logic are set to respective default coordinate systems in response to the resetting being caused by the device 10 being in the fully open state. Conversely, in the case where the first sensor unit 34 orientation processing logic and the second sensor unit 36 orientation processing logic both utilize the same coordinate system, the coordinate system of one of the first sensor unit 34 orientation processing logic and the second sensor unit 36 orientation processing logic is aligned with the coordinate system of the other of the first sensor unit 34 orientation processing logic and the second sensor unit 36 orientation processing logic in response to the resetting being caused by the device 10 being in the closed state. For example, in the next execution of the method 40, the coordinates system of the first sensor unit 34 orientation processing logic is changed to be aligned to the coordinate system of the second sensor unit 36 orientation processing logic by applying a transformation matrix to the coordinates system of the first sensor unit 34 orientation processing logic.

In addition, in the second embodiment and in the next execution of the method 40, the remapping in block 58 is customized based on whether the resetting is in response to the device 10 being in the fully open state or the closed state.

In a case where the resetting is caused by the device 10 being in the fully open state, the estimated lid angle $lid_o$ is calculated using equation (10) as discussed above. Conversely, in a case where the resetting is caused by the device 10 being in the closed state, the estimated lid angle $lid_o$ is calculated using equation (11) below:

$$lid_o = d \quad (11)$$

In one embodiment, in order to avoid excessive resets of the first sensor unit 34 and the second sensor unit 36, the application processor 38 transmits the reset signal in a case where a threshold amount of time has passed since the previous reset signal transmission. For example, in response to determining the device 10 is in the steady state and the fully open or closed state, the application processor 38 transmits the reset signal to the first sensor unit 34 and the second sensor unit 36 in a case where a threshold amount of time (e.g., 30 seconds, 1 minute, etc.) has passed since the previous reset signal transmission. Conversely, in response to determining the device 10 is in the steady state and the fully open or closed state, the application processor 38 skips transmission of (i.e., does not transmit) the reset signal to the first sensor unit 34 and the second sensor unit 36 in a case where the threshold amount of time has not passed since the previous reset signal transmission.

Upon completion of block 64, the method 40 is repeated. Stated differently, the method 40 returns to block 42.

The various embodiments disclosed herein provide a device and method for lid angle detection. While the device is in the sleep state, first and second sensor units measure acceleration and angular velocity, and calculate orientations of the respective lid components based on the acceleration and angular velocity measurements. Upon the device exiting the sleep state, the application processor estimates the lid angle using the calculated orientations, sets the estimated lid angle as an initial lid angle, and updates the initial lid angle using one or more of acceleration, magnetometer, or gyroscope measurements. As a result, the initial lid angle is accurate even in cases where the device is in an upright position or a non-steady state upon exiting the sleep state. Further, utilizing the first and second sensor units to estimate the respective lid orientations while the device is in the sleep state lowers the overall system current consumption, since the device does not have to be kept in an active state.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a first component including:
      a first user interface; and
      a first sensor unit configured to determine a first orientation of the first component;
   a second component coupled to the first component and configured to fold onto the first component, the second component including:
      a second user interface; and
      a second sensor unit configured to determine a second orientation of the second component; and
   a processor configured to:
      estimate an angle between the first component and the second component based on the first orientation and the second orientation;
      determine the device is in a steady state;
      determine the device is in a fully open state or a closed state, the first user interface and the second user interface facing the same direction in the fully open state, the first user interface and the second user interface facing each other in the closed state; and
      reset orientation processing logic of the first sensor unit and orientation processing logic of the second sensor unit in a case where the device is in (1) the steady state and (2) the fully open state or the closed state.

2. The device of claim 1 wherein the processor is configured to:
   set a coordinate system of the orientation processing logic of the first sensor unit and a coordinate system of the orientation processing logic of the second sensor unit to default coordinate systems in a case where the device is in the steady state and the fully open state.

3. The device of claim 1 wherein the processor is configured to:
   align a coordinate system of the orientation processing logic of the first sensor unit with a coordinate system of the orientation processing logic of the second sensor unit in a case where the device is in the steady state and the closed state.

4. The device of claim 3 wherein the coordinate system of the orientation processing logic of the first sensor unit is aligned with the coordinate system of the orientation processing logic of the second sensor unit with a transformation matrix.

5. The device of claim 1 wherein
   the first sensor unit determines the first orientation and the second sensor unit determines the second orientation in a case where the device is in a sleep state, and
   the processor estimates the angle in a case where the device is in an awake state.

6. The device of claim 5 wherein
   the processor is configured to set the estimated angle as an initial angle of the device, and
   the initial angle is an angle between the first component and the second component subsequent to the device exiting the sleep state and entering the awake state.

7. The device of claim 6 wherein the processor sets the estimated angle as the initial angle in a case where the device is in an upright position or in a non-steady state.

8. The device of claim 1 wherein the processor is configured to:
   convert the first orientation and the second orientation from a first format to a second format different from the first format;
   determine a distance between the converted first orientation and the second orientation; and remap the distance to the estimated angle.

9. The device of claim 8 wherein, in a case where the device is in the steady state and the fully open state, the estimated angle is equal to 360−(d+180), where d is the distance.

10. The device of claim 8 wherein, in a case where the device is in the steady state and the closed state, the estimated angle is equal to d, where d is the distance.

11. The device of claim 1 wherein the processor is configured to reset the orientation processing logic of the first sensor unit and the orientation processing logic of the second sensor unit in a case where a threshold amount of time has passed since a previous reset of the orientation processing logic of the first sensor unit and the orientation processing logic of the second sensor unit.

12. A method, comprising:
determining, by a first sensor unit, a first orientation of a first component of a device, the first component including a first user interface and the first sensor unit;
determining, by a second sensor unit, a second orientation of a second component of the device, the second component configured to fold onto the first component, the second component including a second user interface and the second sensor unit;
estimating, by a processor, an angle between the first component and the second component based on the first orientation and the second orientation;
determining, by the processor, the device is in a steady state;
determining, by the processor, the device is in a fully open state or a closed state, the first user interface and the second user interface facing the same direction in the fully open state, the first user interface and the second user interface facing each other in the closed state; and
resetting, by the processor, orientation processing logic of the first sensor unit and orientation processing logic of the second sensor unit in a case where the device is in (1) the steady state and (2) the fully open state or the closed state.

13. The method of claim 12, further comprising:
setting, by the processor, a coordinate system of the orientation processing logic of the first sensor unit and a coordinate system of the orientation processing logic of the second sensor unit to default coordinate systems in a case where the device is in the steady state and the fully open state.

14. The method of claim 12, further comprising:
aligning, by the processor, a coordinate system of the orientation processing logic of the first sensor unit with a coordinate system of the orientation processing logic of the second sensor unit in a case where the device is in the steady state and the closed state.

15. The method of claim 14 wherein the aligning includes applying a transformation matrix to the coordinate system of the orientation processing logic of the first sensor unit.

16. The method of claim 12, further comprising:
converting, by the processor, the first orientation and the second orientation from a first format to a second format different from the first format;
determining, by the processor, a distance between the converted first orientation and the second orientation; and
remapping, by the processor, the distance to the estimated angle.

17. The method of claim 16 wherein, in a case where the device is in the steady state and the fully open state, the remapping includes setting the estimated angle to be equal to 360−(d+180), where d is the distance.

18. The method of claim 16 wherein, in a case where the device is in the steady state and the closed state, the remapping includes setting the estimated angle to be equal to d, where d is the distance.

19. A device, comprising:
a first user interface;
a first sensor unit;
a first housing including the first user interface and the first sensor unit, the first sensor unit configured to determine a first orientation of the first housing based on measurements generated by the first sensor unit;
a second user interface;
a second sensor unit;
a second housing coupled to the first housing, the second housing configured to move between a first position in which the second housing is on the first housing and a second position in which the second housing is spaced away from the first housing, the second housing including the second user interface and the second sensor unit, the second sensor unit configured to determine a second orientation of the second housing based on measurements generated by the second sensor unit; and
a processor configured to:
estimate an angle between the first housing and the second housing based on the first orientation and the second orientation;
determine whether or not the device is in a steady state;
determine whether the device is in a fully open state or a closed state, the first user interface and the second user interface facing the same direction in the fully open state, the first user interface and the second user interface facing each other in the closed state; and
reset orientation processing logic of the first sensor unit and orientation processing logic of the second sensor unit in a case where the device is in (1) the steady state and (2) the fully open state or the closed state.

20. The device of claim 19 wherein the processor is configured to:
set a coordinate system of the orientation processing logic of the first sensor unit and a coordinate system of the orientation processing logic of the second sensor unit to default coordinate systems in a case where the device is in the steady state and the fully open state; and
align a coordinate system of the orientation processing logic of the first sensor unit with a coordinate system of the orientation processing logic of the second sensor unit in a case where the device is in the steady state and the closed state.

* * * * *